United States Patent [19]

Wohlford

[11] 4,428,625

[45] Jan. 31, 1984

[54] DRIVE TRACK LINK INCLUDING SEPARABLE WEAR AND BASE COMPONENTS

[75] Inventor: William P. Wohlford, Bettendorf, Iowa

[73] Assignee: Deere & Company, Moline, Ill.

[21] Appl. No.: 344,668

[22] Filed: Feb. 1, 1982

[51] Int. Cl.³ ...................... B62D 55/24; B62D 55/26
[52] U.S. Cl. .................................. 305/12; 305/35 R; 305/43; 305/54
[58] Field of Search ............ 305/11, 12, 35 R, 35 EB, 305/36, 40, 43, 54, 57; 198/850–853; 474/901

[56] References Cited

U.S. PATENT DOCUMENTS 2,494,066  1/1950  Slemmons ............................ 305/38
2,515,128  7/1950  Lammertse .......................... 305/38
3,346,306  10/1967  Siber .................................... 305/40

Primary Examiner—David A. Scherbel

[57] ABSTRACT

A track section of an endless traction drive track includes a track link including a wear component including rail portions for engaging support rollers and a sprocket-engaging portion for being engaged by the track drive sprocket. The track link includes a base portion, and the track link is secured to a grouser so that end portions of a pair of rectangular flexors are sandwiched between the link and grouser. The base and wear components are releasably held together by some of the fasteners which secure the track link and grouser together so that the wear component may be replaced without requiring the breaking of the drive track.

19 Claims, 12 Drawing Figures

DRIVE TRACK LINK INCLUDING SEPARABLE WEAR AND BASE COMPONENTS

BACKGROUND OF THE INVENTION

The present invention relates to drive track links for track laying vehicle tracks and more specifically relates to such links as are adapted for being embodied in track sections including flexors for permitting flexure between adjacent sections forming the tracks.

U.S. Application Ser. No. 344,669, filed on an even date with the instant application illustrates a track section including a pair of side-by-side disposed, rectangular flexors having first end portions clamped in sandwiched relationship between a drive track link and a grouser. The drive track link includes spaced apart rail portions, adapted for engaging track support rollers, joined together at one of their ends by a sprocket-engaging portion and joined together intermediate of their ends by a sprocket receptacle-cleaning portion. The sprocket-engaging portion is made in the form of a cylindrically curved base component on which is received a C-shaped wear component, the wear component being mountable on the base component by moving it into engagement with the base component while in a first attitude and then rotating it into place wherein it is held by virtue of the geometry of the base component and an interfering surface of the grouser after the track link is secured thereto.

While the track link of the above-described co-pending application is generally satisfactory, it has the drawbacks of requiring a track to be broken in order to replace the wear component of the track link and it makes no provision for replacing the rail portions, which are also subject to a relatively great amount of wear as compared to those portions of the link used for presenting clamping surfaces for the flexors.

SUMMARY OF THE INVENTION

The present invention relates to track links for track sections embodying flexors and more specifically relates to improvements in the track link disclosed in the above-described co-pending U.S. Application Ser. No. 344,699.

A broad object of the invention is to provide a track link section having base and wear components releasably secured to each other in such a manner that they may be disconnected from each other without requiring the track in which they are embodied to be broken. More specifically it is an object of the invention to provide a track link including base and wear components, each comprising transversely spaced right- and left-hand portions, with one or both of these spaced portions being interconnected at first ends thereof by transverse bar portions, respectively at locations intermediate the ends thereof by a second transverse bar portion forming the whole or part of a sprocket-engaging portion and forming a sprocket receptacle-cleaning portion.

A further object is to provide a track link as set forth hereinabove which is secured to a grouser by a first pair of fasteners, which also serves to hold the base and wear components thereof together, and also by a second set of fasteners which are associated only with the base component whereby the first set of fasteners may be removed to permit replacement of the wear component without breaking the track in which the track link is embodied.

These and other objects will become apparent from a reading of the ensuing description together with the appended drawings.

DESCRIPTION OF THE PREFERRED EMBODIMENT

Figure 1:
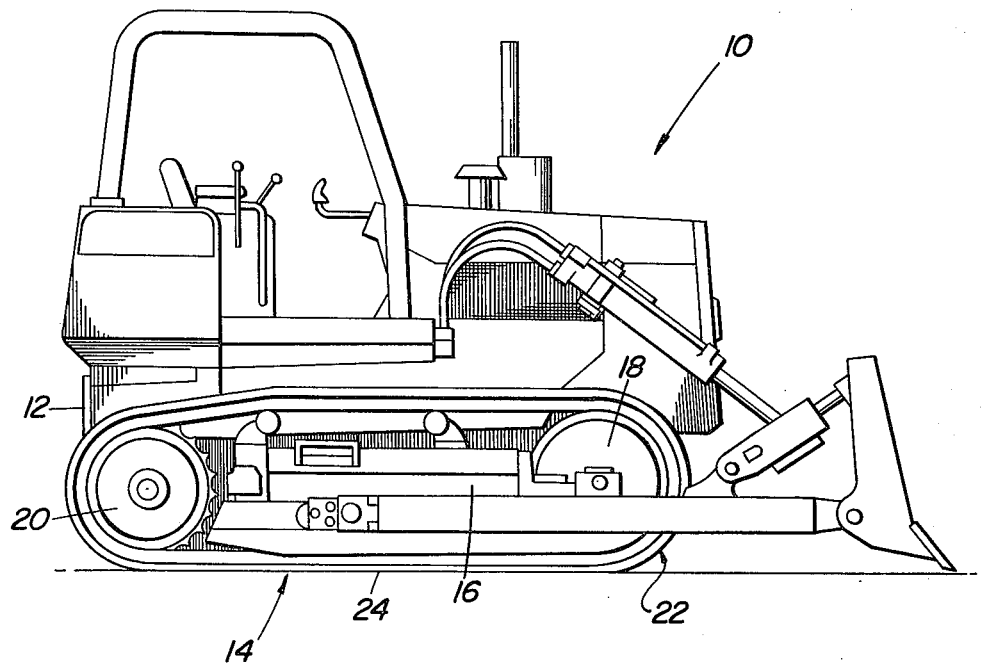
FIG. 1 is a right side elevational view of a track laying vehicle exemplifying the type of vehicles with which the present invention is particularly adapted for use.

Referring now to FIG. 1, therein is shown a track laying tractor indicated in its entirety by the reference numeral 10. The tractor 10 includes a main frame 12 having longitudinally-extending drive track assemblies 14 (only one shown) at the opposite sides thereof. Each track assembly 14 includes a longitudinally-extending track frame 16 having an idler wheel 18 supported on the forward end thereof for fore-and-aft shifting movement. A track drive sprocket 20 is supported from the main frame 12 in fore-and-aft alignment with the idler wheel 18, and extending about the idler wheel and drive sprocket is an endless drive track 22. The drive track 22 includes a lower run 24 which is in ground contact, and it is here noted that the description of a section of the track 22 contained hereinafter is made with reference to the track section being located in the lower run 24 and with reference to being observed by one facing in the forward direction of travel of the tractor 10.

Figure 2:
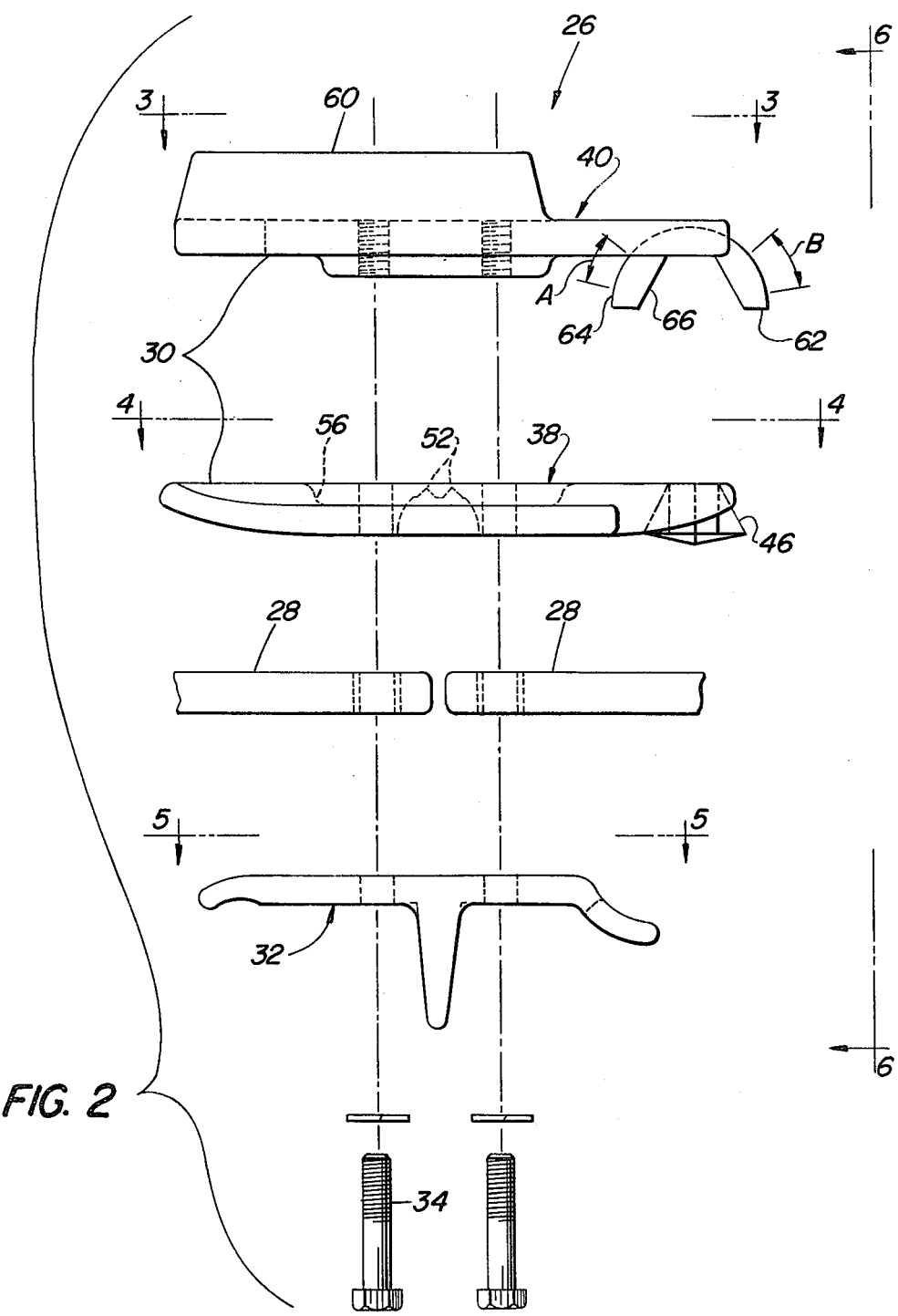
FIG. 2 is an exploded right side view of a track section embodying a two-piece link constructed in accordance with the present invention.
Figure 6:
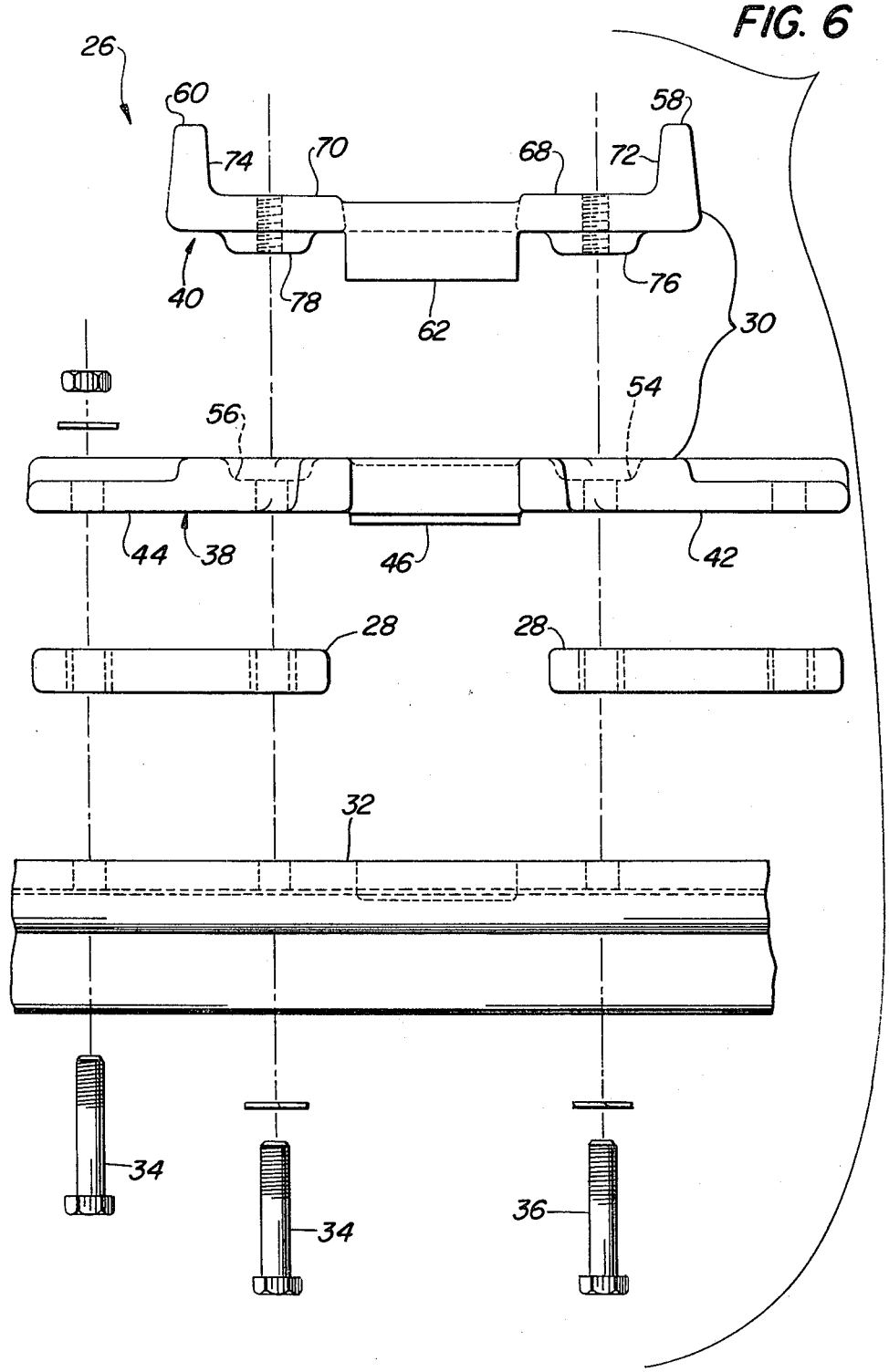
FIG. 6 is an exploded end view of the track section shown in FIG. 2.

Referring now to FIGS. 2 and 6, therein is shown a track section 26 which is adapted to be joined to a plurality of like sections to from the drive track 22. The track section 26 includes a pair of transversely spaced, rectangular, resilient flexors 28 having respective first end portions sandwiched between a track link 30 and a grouser 32, which are held together by left- and right-hand pairs of side-by-side disposed bolts 34 and 36, respectively. It is here noted that the link 30 and grouser 32 are intended to also sandwich respective end portions of the flexors of an adjacent track section and that pairs of bolts similar to the pairs of bolts 34 and 36 would also be provided for holding the link 30 and grouser 32 together.

The link 30 is a two-piece member including a base component 38 and a wear component 40 secured together by one of each of the pairs of bolts 34 and 36 and by one of each of the similar pairs of bolts (not shown) provided for connecting the link 30 and grouser 32 together in clamping relationship to respective end portions of a pair of flexors of an adjacent track section.

Specifically, the base component 38 includes right- and left-hand, transversely spaced plate portions 42 AND 44 (FIG. 6), respectively, having their respective forward ends interconnected by a transverse bar portion 46 and being interconnected at respective locations intermediate their opposite ends by a transverse receptacle-cleaning portion 48. A generally rectangular sprocket tooth clearance opening 50 is defined by the plate portions 42 and 44, and the bar and receptacle-cleaning portions 46 and 48. As viewed in FIG. 2, the bar portion 46 includes an upper portion which is generally in the shape of one-half of a hexagon while the upper portion of the cleaning portion 48 defines a pair of transversely extending, wedge-shaped ribs 52.

Formed in the upper surface of the plate portions 42 and 44 at opposite ends of the ribs 52 are right-and left-hand oval-shaped depressions respectively forming mounting receptacles 54 and 56.

Figure 3:
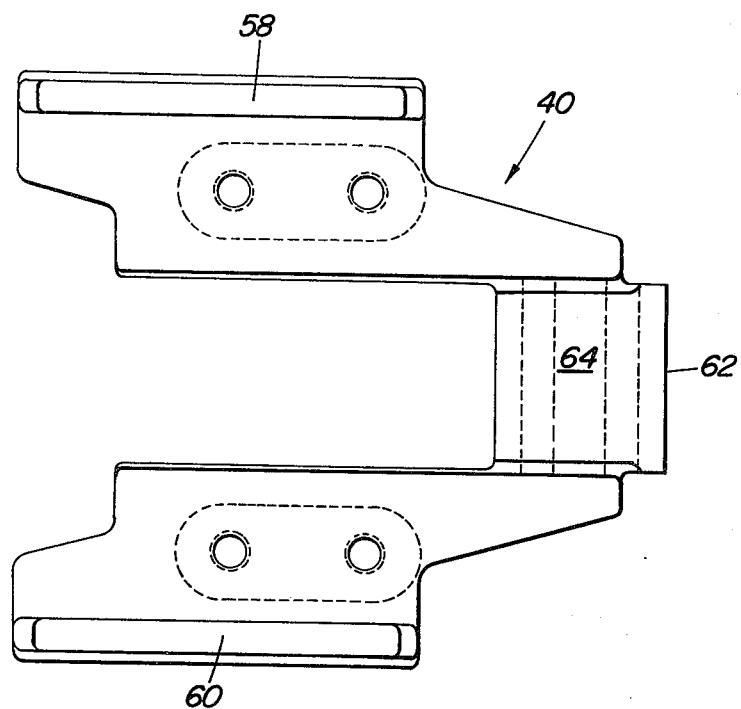
FIG. 3 is a view taken along line 3—3 of FIG. 2 and showing the replaceable portion of the link of the track section.
Figure 4:
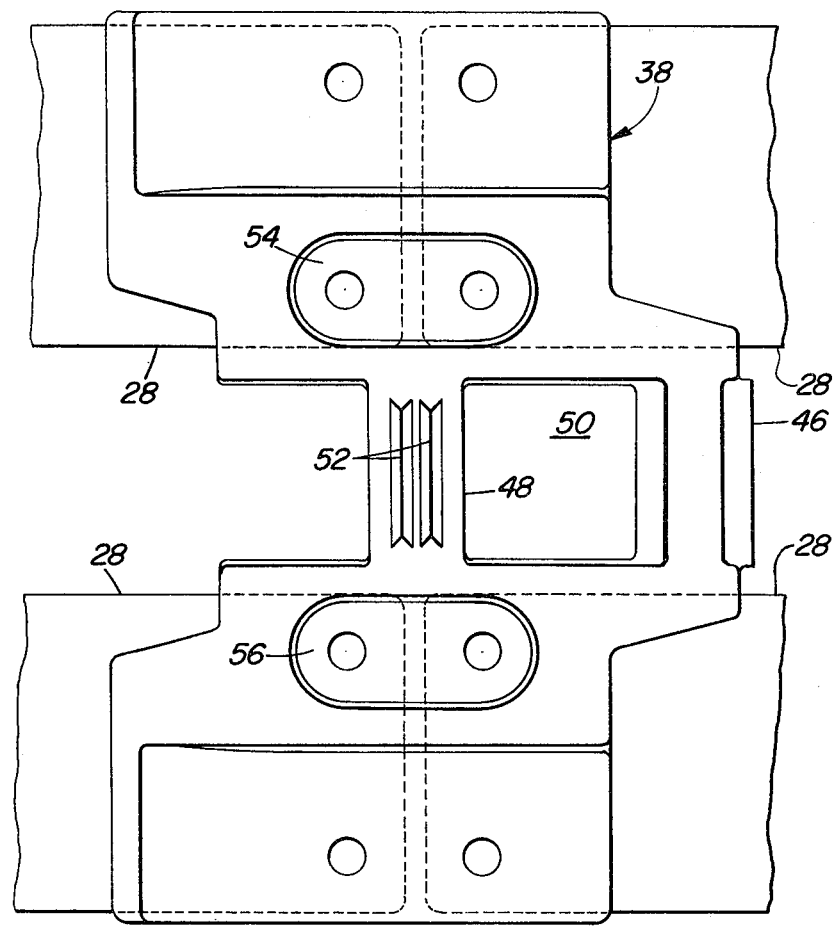
FIG. 4 is a view taken along line 4—4 of FIG. 2 and showing the base portion of the link of the track section.
Figure 5:
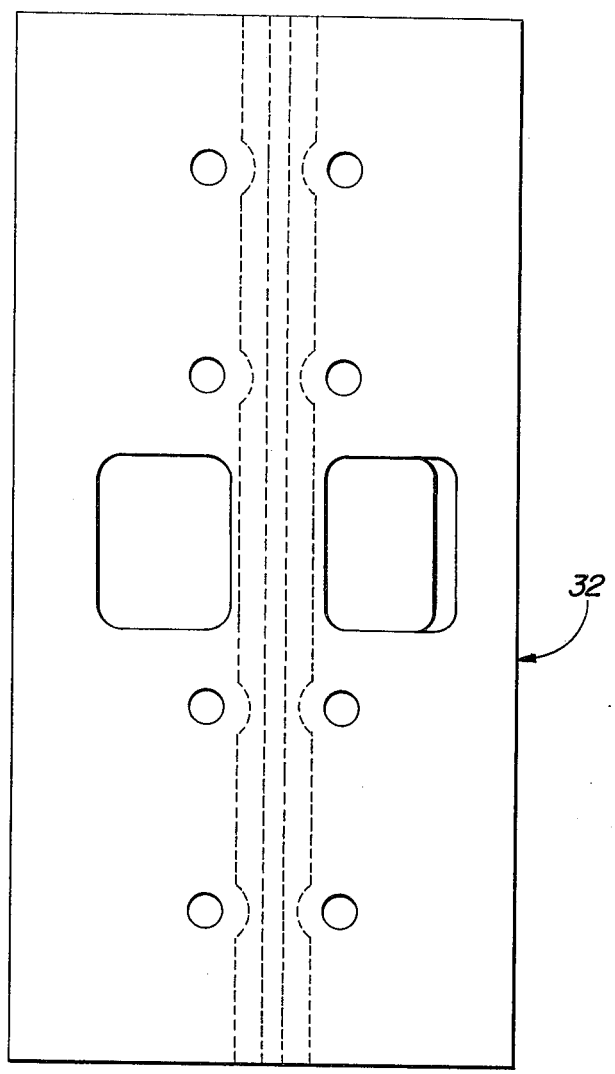
FIG. 5 is a view taken along line 5—5 of FIG. 2 and showing the grouser of the track section.

The wear component 40 is generally U-shaped (FIG. 3) and includes right- and left-hand transversely spaced rail portions 58 and 60 (FIG. 2), respectively, having their respective forward ends joined together by a transverse sprocket-engaging wear cap portion 62 having a cylindrically-shaped upper surface 64 and a lower surface 66 defining a receptacle shaped complementary to and receiving the upper portion of the bar portion 46. The wear cap portion 62 is adapted to engage the sprocket 20 such that force is transferred during forward and reverse driving action from the sprocket to the cap portion generally in zones A and B, respectively. The radial thickness of the cap portion in the zones A and B is increased to reflect the extra wear expected in this zone. The rail portions 58 and 60 are each generally L-shaped in end view (FIG. 6) and respectively define generally horizontal roller bearing portions 68 and 70 and generally vertical roller guide portions 72 and 74. The bearing portions 68 and 70 respectively have lower surfaces which define mounting bosses 76 and 78 shaped complementary to and received in the mounting receptacles 54 and 56 of the base component 38. Vertically aligned holes are provided so as to intersect the receptacles 54 and 56 of the base component 38 and the bosses 76 and 78 of the wear component 40 and define mounting holes for receiving the mounting bolts 34 and 36 of the track section 26 and the similar mounting bolts (one shown in FIG. 2) of an adjacent track section.

Thus, it will be appreciated that the wear component 40 includes the surfaces of the track link 30 most apt to wear during operation of the tractor 10 and that the wear component 40 can be released from the base component 38 by removal of only the inner ones of the pairs of bolts 34 and 36. The outer ones of the pairs of bolts 34 and 36 then act to keep the adjacent track section coupled to that track section having its wear component replaced.

For some applications, it may be desirable to make the sprocket-engaging structure of one piece in which case the structure may either be formed as part of the wear component or as part of the base component.

Figure 7:
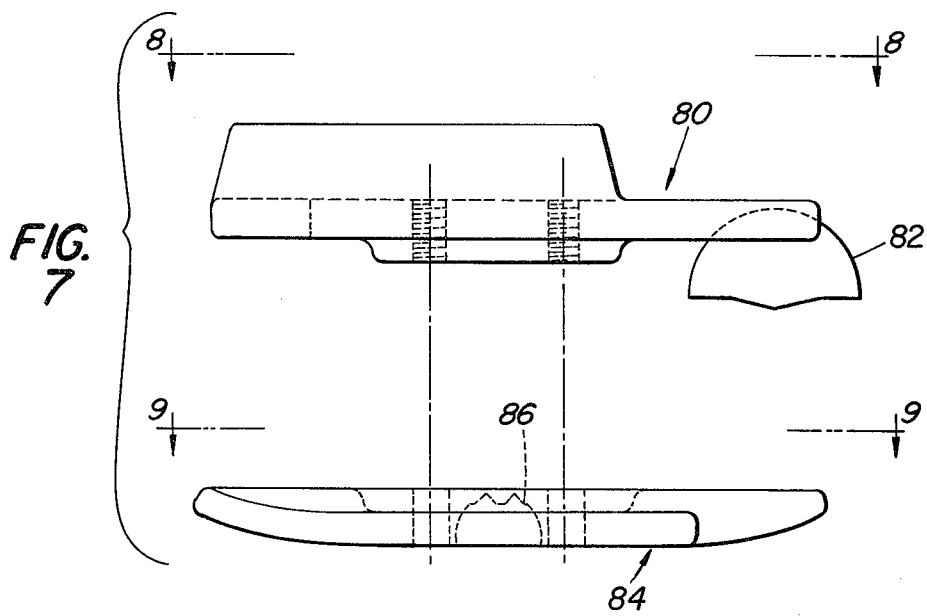
FIG. 7 is an exploded side view of an alternate embodiment showing the sprocket-engaging structure formed as one piece with the wear component.
Figure 8:
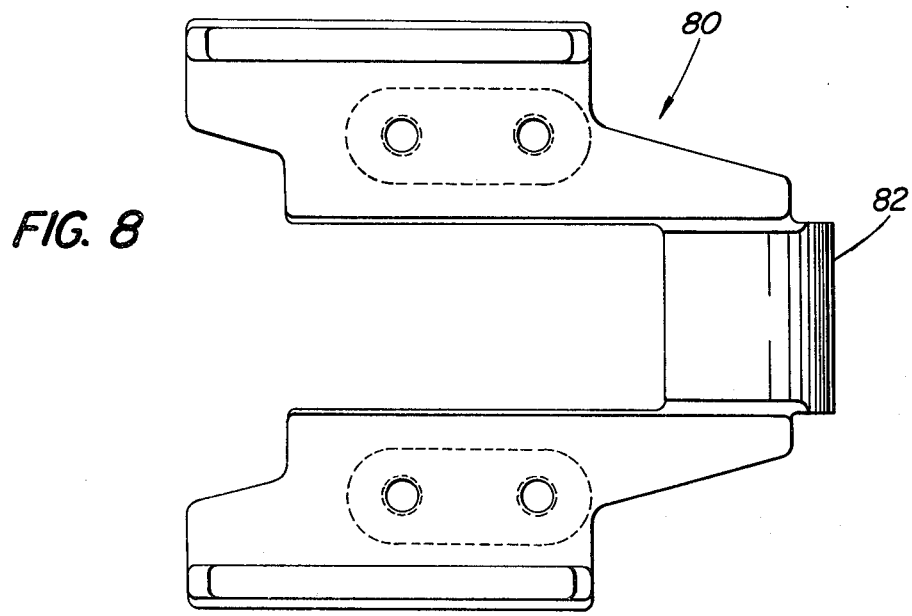
FIGS. 8 and 9 are views respectively taken along lines 8—8 and 9—9 of FIG. 7.
Figure 9:
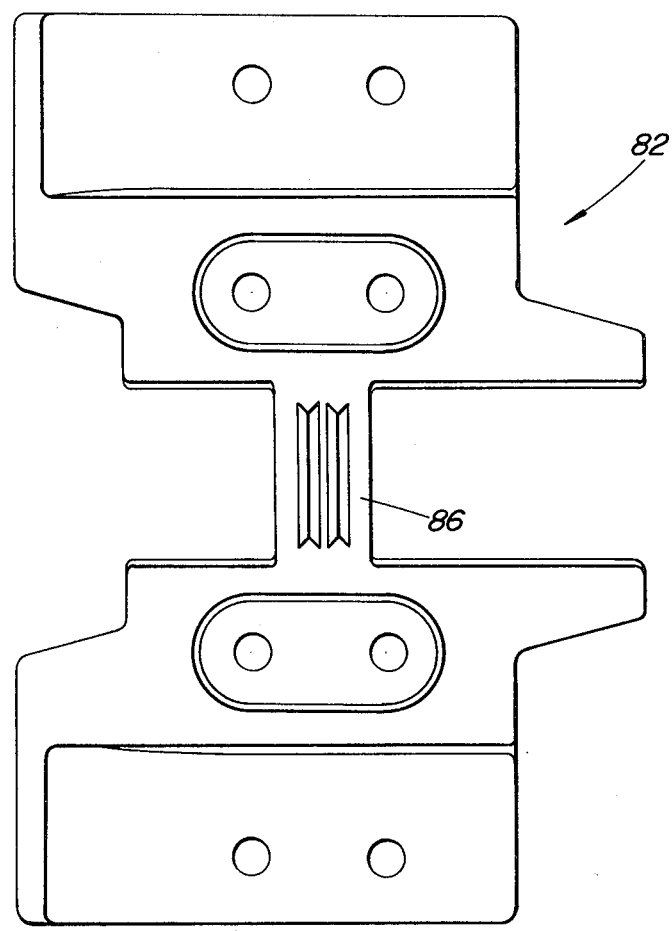

Specifically, with reference to FIGS. 7–9, therein is shown a wear component 80 having a sprocket-engaging portion 82, defined by a generally semi-cylindrical bar, 82 formed as an integral part and joining respective ends of transversely spaced rail portions thereof. Also shown is a base component 84 for use with the wear component 80, the base component 84 being like the previously described base component 38 except that it does not have a transverse bar joining respective first ends of transversely spaced plate portions thereof.

Figure 10:
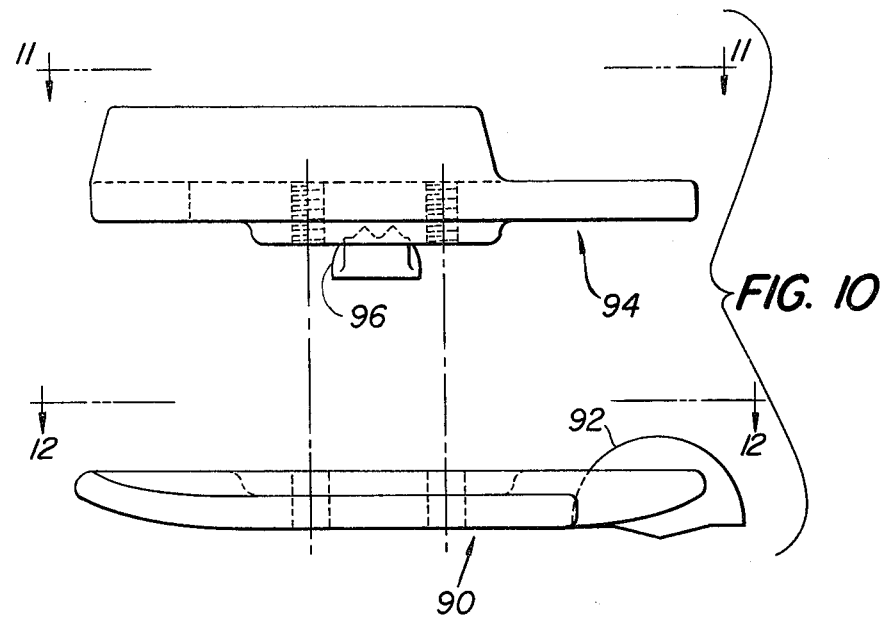
FIG. 10 is an exploded side view of another alternate embodiment showing the sprocket-engaging structure formed as one piece with the base component and the sprocket receptacle-cleaning portion formed as one piece with the wear component.
Figure 11:
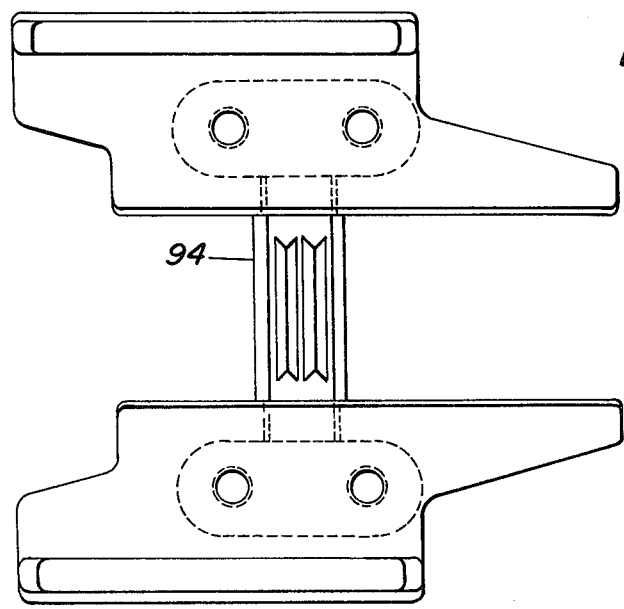
FIGS. 11 and 12 are views respectively taken along lines 11—11 and 12—12 of FIG. 10.
Figure 12:
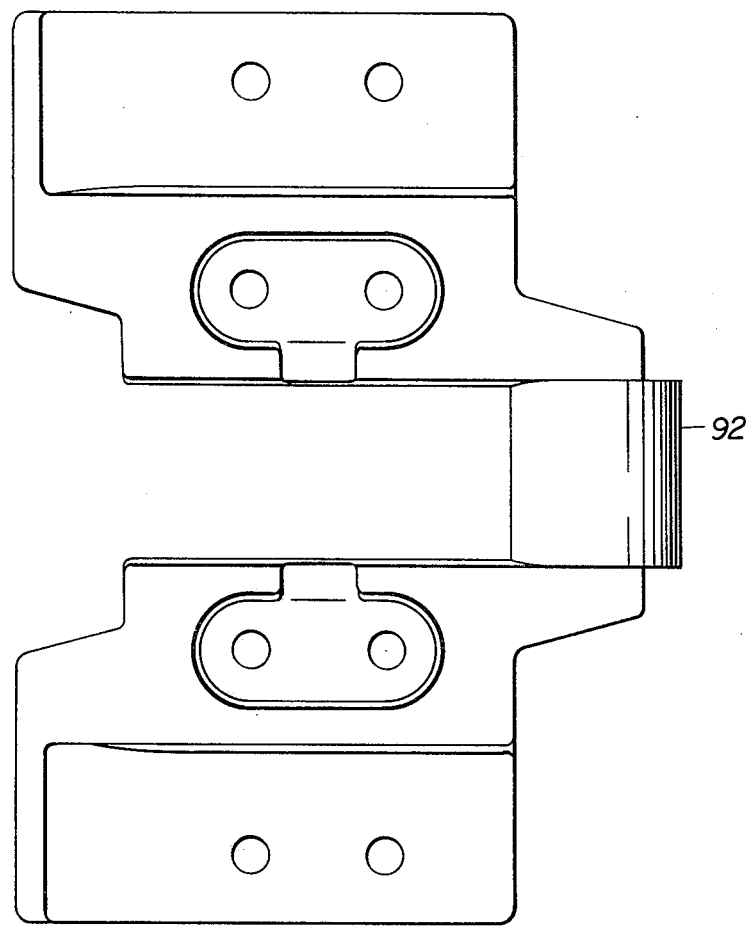

With reference to FIGS. 10–12, therein is shown a base component 90 having a sprocket-engaging portion 92, defined by a generally semi-cylindrical bar, formed as an integral part and joining respective first ends of transversely spaced mounting portions thereof. Also shown is a wear component 94 for use with the base component 90, the wear component having a sprocket receptacle-cleaning portion 96 defined by a transverse bar joining respective intermediate locations of a pair of transversely spaced rail portions of the wear component 94. In lieu of making the receptacle-cleaning portion 96 a part of the wear component, it may form a part of the base component as described above, however the spaced rail portions of the wear component then would be made separate, one from the other.

I claim:

1. A track link, adapted for use in a track section of a drive track for a track laying vehicle, comprising: a wear component having right- and left-hand transversely spaced, longitudinally extending wear member portions; a base component having right- and left-hand transversely spaced, longitudinally extending base plate portions respectively located beneath the right- and left-hand wear member portions and extending transversely therebeyond; fastener means releasably securing said wear and base components together; and at least a part of a transverse sprocket-engaging portion forming an integral part of and joining respective first ends of one of the right- and left-hand base plate portions and the right- and left-hand wear member portions.

2. The track line defined in claim 1 wherein said sprocket-engaging portion is formed in its entirety as an integral part of said wear component and is joined to respective first ends of said right- and left-hand wear member portions; said base component includes a transverse bar portion joining said right- and left-hand base plate portions at respective locations intermediate opposite ends of the base-plate portions; and said bar portion and sprocket-engaging portions being spaced longitudinally from each other by a distance for permitting them to enter adjacent receptacles defined by teeth of a drive sprocket with which a track embodying the track link is adapted for use.

3. The track link defined in claim 2 wherein transverse rib means are formed along the bar portion; whereby the latter serves as a sprocket receptacle-cleaning means.

4. The track link defined in claim 1 wherein said sprocket-engaging portion is formed entirely as a part of said base component and joins respective first ends of the right- and left-hand base plate portions of the latter.

5. The track link defined in claim 4 and further including a transverse bar portion spaced from said sprocket-engaging portion and joining respective intermediate locations of the right- and left-hand base plate portions, with the distance between the bar and sprocket-engaging portion being such as to permit said portions to respectively enter adjacent receptacles defined by a drive sprocket with which a track embodying the track link is adapted for use.

6. The track link defined in claim 4 and further including a transverse bar portion formed as an integral part of and joining said right- and left-hand wear member portions at respective intermediate locations of the latter; and said transverse bar portion being spaced from the sprocket-engaging portion by a distance permitting the bar and sprocket-engaging portions to respectively enter adjacent receptacles formed by the teeth of a drive sprocket with which a track embodying the track link is adapted for use.

7. The track link defined in claim 1 wherein said wear component includes a part of said transverse sprocket-engaging portion in the form of a wear cap portion joining respective first ends of the right- and left-hand wear member portions and defining an upwardly facing arcuate surface and a downwardly opening receptacle; said base component including a transverse bar portion forming a further part of the sprocket-engaging portion and joining respective first ends of the right- and left-hand base plate portions and being shaped complementary to and received within said receptacle formed by the wear cap portion.

8. The track link defined in claim 7 and further including a second transverse bar portion joining respective locations intermediate opposite ends of the right- and left-hand base plate portions and being spaced from the sprocket-engaging portion by a distance permitting the sprocket-engaging portion and the second transverse bar portion to respectively enter adjacent receptacles defined by the teeth of a drive sprocket with which a chain embodying the track link is adapted for use.

9. The track link defined in claim 7 wherein said wear component further includes a second transverse bar portion joining said right- and left-hand base plate portions at respective locations intermediate opposite ends thereof; and said second transverse bar portion being spaced from the sprocket-engaging portion by a distance permitting the bar and sprocket-engaging portions to respectively enter adjacent receptacles defined by teeth of a drive sprocket with which a track embodying the track link is adapted for use.

10. The track link defined in either one of claims 8 or 9 wherein the second transverse bar portion includes cleaning rib means whereby the second transverse bar portion serves to clean sprocket receptacles.

11. The track link defined in claim 1 wherein said right- and left-hand longitudinally extending wear member portions are each generally L-shaped in vertical transverse cross section whereby they each define a roller bearing portion and a roller guide portion.

12. A track link, adapted for use in a track section of a drive track for a track laying vehicle, comprising: a wear component which is generally U-shaped in top plan view and includes right- and left-hand transversely spaced, longitudinally extending legs joined at one of their ends by a transverse sprocket-engaging wear cap portion defining an upwardly facing arcuate surface and a downwardly opening receptacle; a base component located beneath the wear component and including right- and left- hand plate portions, respectively, underlying and extending oppositely, transversely beyond the right- and left-hand legs; the right- and left-hand plate portions of the base component being interconnected at one of their ends by a transverse bar portion shaped complementary to and received in said receptacle; and fastener means releasably securing the wear and base components together.

13. The track link defined in claim 12 wherein the right- and left-hand longitudinally extending legs are each generally L-shaped in vertical transverse cross section whereby each leg defines a roller being portion and a roller guide portion.

14. The track link defined in claim 12 wherein the receptacle defined by the sprocket-engaging member is generally in the shape of one-half of a hexagon as viewed from an end of the receptacle.

15. The track link defined in claim 12 wherein the arcuate surface of the sprocket-engaging member is adapted to be drivingly engaged in a preselected zone by a drive sprocket tooth and said sprocket-engaging member being of increased thickness in a direction crosswise to the preselected zone.

16. A track section, adapted for forming part of an endless drive track of a track laying vehicle, comprising: a pair of spaced, side-by-side arranged generally rectangular resilient flexors; a grouser having a first generally planar surface and a cleat projecting oppositely from the planar surface; said flexors having approximately one-third of the length thereof engaged with said planar surface; a track link including a base component and a wear component; said base component including a pair of side-by-side arranged plate portions respectively having second and third generally planar surfaces disposed in opposition to said first planar surface and cooperating with the latter to respectively tightly sandwich the pair of flexors; the pair of plate portions being joined together by a bar portion extending therebetween; said wear component having a pair of wear member portions spaced from each other and respectively disposed in engagement with the pair of plate portions of the base component; first fastener means simultaneously clamping the base and wear components together and clamping the link and grouser in sandwiching relationship to the flexors; and second fastener means cooperating with the first fastener means for only clamping the base component and the grouser in sandwiching relationship to the flexors, whereby the wear component of the link may be separated from the base component while the flexors remain sandwiched between the base component and grouser.

17. The track section defined in claim 16 and further including a second bar portion defining a sprocket-engaging portion joined to respective first ends of the right- and left-hand wear member portions; and the first-named bar portion joining said respective locations intermediate opposite ends of the pair of plate portions; and said sprocket-engaging portion being spaced from the second bar portion by a distance permitting the sprocket-engaging and second bar portions to respectively enter adjacent receptacles defined by teeth of a drive sprocket with which the drive track is adapted for use.

18. A track section, adapted for forming part of an endless drive track of a track laying vehicle, comprising: a pair of spaced, side-by-side arranged generally rectangular resilient flexors; a grouser having a first generally planar surface and a cleat projecting oppositely from the planar surface; said flexors having approximately one-third of the length thereof engaged with said planar surface; a two-piece link including a base component and a wear component; said base component including a pair of side-by-side arranged plate portions respectively having second and third generally planar surfaces disposed in opposition to said first planar surface and cooperating with the latter to respectively tightly sandwich the pair of flexors; the pair of link portions having respective forward end portions joined together by a bar portion; said wear component being generally U-shaped and having a pair of legs spaced from each other and respectively disposed in engagement with the pair of plate portions of the base component; respective ends of the legs being joined by a sprocket-engaging portion defining a receptacle shaped complementary to and receiving said bar portion and defining an arcuate sprocket-engaging surface facing away from said receptacle; first fastener means simultaneously clamping the base and wear components together and clamping the link and grouser in sandwiching relationship to the flexors; and second fastener means cooperating with the first fastener means for only clamping said base component and grouser in sandwiching relationship to the flexors, whereby the wear component of the link may be separated from the base component while the flexors remain sandwiched between the link and grouser.

19. The track section defined in claim 18 wherein a second bar portion joins the plate portions of the base component, the second bar portion extending parallel to the first mentioned bar portion and being spaced therefrom a distance corresponding generally to the circular pitch of a sprocket with which the track section is intended to be used; and said second bar portion defining rib means adapted for entering and cleaning spaces between adjacent teeth of a sprocket whereby the track section forming a part of an endless track composed of similar links and meshed with a sprocket having an odd number of teeth will operate to enter and clean a different set of alternate spaces between the teeth of the sprocket during each revolution of the sprocket.

* * * * *